(12) United States Patent
Sekiguchi et al.

(10) Patent No.: US 9,299,378 B2
(45) Date of Patent: Mar. 29, 2016

(54) MAGNETIC RECORDING MEDIUM HAVING A RECORDING LAYER WITH A DIFFRACTION PEAK OF MAGNETIC ATOMS

(71) Applicant: Sony Corporation, Tokyo (JP)

(72) Inventors: Noboru Sekiguchi, Miyagi (JP); Junichi Tachibana, Miyagi (JP); Tetsuo Endo, Miyagi (JP); Tomoe Ozaki, Miyagi (JP); Hikaru Terui, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/666,581

(22) Filed: Mar. 24, 2015

(65) Prior Publication Data

US 2015/0279402 A1    Oct. 1, 2015

(30) Foreign Application Priority Data

Mar. 31, 2014 (JP) ................. 2014-074953

(51) Int. Cl.
*G11B 5/667* (2006.01)
*G11B 5/73* (2006.01)
*G11B 5/738* (2006.01)
*G11B 5/851* (2006.01)
*G11B 5/64* (2006.01)

(52) U.S. Cl.
CPC ........ *G11B 5/667* (2013.01); *G11B 5/64* (2013.01); *G11B 5/738* (2013.01); *G11B 5/7325* (2013.01); *G11B 5/851* (2013.01)

(58) Field of Classification Search
CPC ........ G11B 5/667; G11B 5/738; G11B 5/851; G11B 5/7325
USPC ........................................ 360/135; 428/831.2
See application file for complete search history.

(56) References Cited

U.S. PATENT DOCUMENTS

| | | | |
|---|---|---|---|
| 2004/0213949 A1* | 10/2004 | Umezawa et al. | 428/65.3 |
| 2005/0019608 A1* | 1/2005 | Kim et al. | 428/694 BS |
| 2005/0255336 A1* | 11/2005 | Mukai | 428/831 |
| 2005/0255337 A1* | 11/2005 | Mukai | 428/831 |
| 2006/0141292 A1* | 6/2006 | Iwasaki et al. | 428/831 |
| 2011/0111257 A1* | 5/2011 | Kurokawa et al. | 428/800 |
| 2012/0087034 A1* | 4/2012 | Hirotsune et al. | 360/75 |
| 2014/0355156 A1* | 12/2014 | Hirotsune et al. | 360/234.3 |

FOREIGN PATENT DOCUMENTS

JP    2008-287808    11/2008

* cited by examiner

*Primary Examiner* — Angel Castro
(74) *Attorney, Agent, or Firm* — K&L Gates LLP

(57) ABSTRACT

A magnetic recording medium includes a base material which has flexibility, a lower coating layer, and a recording layer, in which, in X-ray diffraction peaks, a value of $\Delta\theta_{50}$ where a diffraction peak of magnetic atoms which are included in the recording layer is measured by a locking curve method is 5° or more to less than 10°.

19 Claims, 6 Drawing Sheets

MAGNETIC RECORDING MEDIUM HAVING A RECORDING LAYER WITH A DIFFRACTION PEAK OF MAGNETIC ATOMS

CROSS REFERENCES TO RELATED APPLICATIONS

The present application claims priority to Japanese Priority Patent Application JP 2014-074953 filed in the Japan Patent Office on Mar. 31, 2014, the entire content of which is hereby incorporated by reference.

BACKGROUND

The present application relates to a magnetic recording medium which uses a base material which has flexibility.

Magnetic recording media which are used for a hard disk drive (referred to below as a "HDD") are generally classified into in-plane magnetic recording media and perpendicular magnetic recording media according to the method of arranging the recording magnetization. From the viewpoint of increasing the recording density, perpendicular magnetic recording media have an advantage compared to in-plane magnetic recording media.

In a perpendicular magnetic recording medium, the easy axis of magnetization of magnetic body microcrystals inside a recording layer is oriented so as to be perpendicular with respect to a substrate. In order to increase the recording density, it is important to orient the easy axis of magnetization of the magnetic body microcrystals so as to be properly aligned in the perpendicular direction.

Japanese Unexamined Patent Application Publication No. 2008-287808 (refer to paragraph [0054]) discloses that, in a magnetic recording medium for an HDD, $\Delta\theta_{50}$, which is an index of orientation dispersion, is suppressed to approximately 3 degrees by suppressing the orientation dispersion of the easy axis of magnetization of magnetic body microcrystals in a perpendicular recording layer.

SUMMARY

It is desirable to provide a magnetic recording medium which is able to obtain both recording and play back characteristics and reliability.

According to an embodiment of the present application, there is provided a magnetic recording medium including a base material which has flexibility, a lower coating layer, and a recording layer, in which, in X-ray diffraction peaks, a value of $\Delta\theta_{50}$ where a diffraction peak of magnetic atoms which are included in the recording layer is measured by a locking curve method is 5° or more to less than 10°.

As described above, it is possible to obtain both recording and play back characteristics and reliability according to the present application. Additional features and advantages are described herein, and will be apparent from the following Detailed Description and the figures.

DETAILED DESCRIPTION

Figure 1:
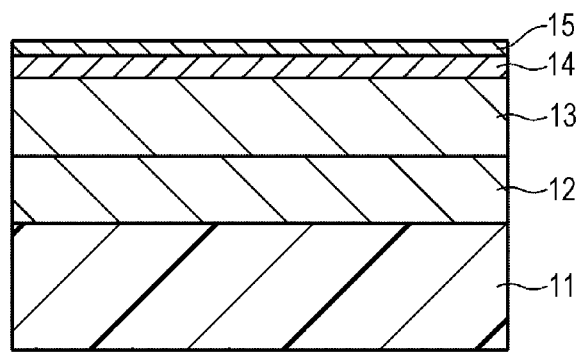
FIG. 1 is a cross-sectional diagram which schematically shows one example of a configuration of a magnetic recording medium according to a first embodiment of the present application.

Magnetic recording media are generally classified into magnetic recording media which use a rigid base material such as a glass substrate or an alloy substrate (often called magnetic recording media used for an HDD) and magnetic recording media which use a flexible base material such as a polymer film (often called magnetic tape). Both media have the following differences in the manufacturing process and recording and play back system.

Difference in Manufacturing Process

In a magnetic recording medium which uses a rigid base material, since a glass substrate, an alloy substrate, or the like is used as described above, it is possible to heat the base material. Accordingly, even in a case of film-forming a thin film on a base material with a poor surface property, if the thin film or the like is film-formed while heating the base material, the film quality of the thin film is not greatly affected by the state of the film-forming surface. In other words, regardless of the state of a film-forming surface, it is possible to film-form a thin film with comparatively desirable film qualities and it is possible to obtain comparatively favorable recording and play back characteristics.

On the other hand, in a magnetic recording medium which uses a flexible base material, it is difficult to heat the base material since a polymer film or the like is used as described above. Accordingly, the state of the film-forming surface of the thin film greatly affects the film quality of the thin film. In other words, the state of the film-forming surface is important in order to film-form a thin film with desirable film quality and obtain favorable recording and play back characteristics.

Difference in Recording and Play Back System

In the recording and play back system of a magnetic recording medium which uses a rigid base material, the medium and a head normally do not slide since a flying head is used. Accordingly, in the recording medium, since it is not necessary to consider the sliding properties, the smoother the film-forming surface of the lower coating layer is, the more desirable from the viewpoint of improving the film quality of the lower coating layer.

On the other hand, in the recording and play back system of a magnetic recording medium which uses a flexible base material, sliding of the medium and the head is taken as a given. For this reason, excessive improvement in the surface property causes increase in friction and the sliding performance decreases. When the sliding property decreases in this manner, it may lead to a decrease in the reliability of the magnetic recording medium.

From the differences between both of the media described above, the following problems, which are unique to magnetic recording media which use a flexible base material, are clear. In a magnetic recording medium which uses a flexible base material, when the film-forming surface of the lower coating layer is smoothed in order to realize excellent recording and play back characteristics, it may lead to a decrease in the sliding performance, that is, a decrease in reliability. In contrast thereto, when the smoothness of the film-forming surface of the lower coating layer is decreased in order to improve the sliding performance, that is, in order to obtain excellent reliability, it may lead to a decrease in the recording and play back characteristics. That is, in a magnetic recording medium which uses a flexible base material, there is a problem in that it is difficult to obtain both recording and play back characteristics and reliability.

Thus, the present inventors carried out intensive research in order to obtain both recording and play back characteristics and reliability in a magnetic recording medium which uses a flexible base material. As a result, it was discovered that, by setting a value of $\Delta\theta_{50}$, in which a diffraction peak of magnetic atoms which are included in the recording layer is measured by a locking curve method, within a range of 5° or more to less than 10°, it is possible to obtain both recording and play back characteristics and reliability.

Examples of a method for setting a value of $\Delta\theta_{50}$ within a range of 5° or more to less than 10° include a method for adjusting the surface property of a lower layer of a lower coating layer, which has a close relationship with the orientation of a magnetic crystal which is included in a recording layer, for example, a surface property of a base material or a soft magnetic underlayer. However, the method for setting the value of $\Delta\theta_{50}$ within a range of 5° or more to less than 10° is not limited thereto and another method may be used.

In the present application, an intermediate layer which is provided between a lower coating layer and a recording layer is preferably further provided. In addition, a CAP layer which is provided to be adjacent to a surface of a recording layer is preferably further provided.

In the present application, each layer of the lower coating layer, the intermediate layer, and the recording layer may have either of a single layer structure and a multi-layer structure. It is preferable to adopt a multi-layer structure from the viewpoint of further improving the recording and play back characteristics or the like of the magnetic recording medium. It is preferable to adopt a multi-layer structure with a two-layer structure when considering manufacturing efficiency.

In the present application, the magnetic recording medium is preferably further provided with a soft magnetic layer which is provided between the base material and the lower coating layer or between the lower coating layer and the recording layer. In a case where the magnetic recording medium is provided with an intermediate layer between a lower coating layer and a recording layer, a soft magnetic layer may be further provided between the lower coating layer and the intermediate layer. Either a single layer structure or a multi-layer structure may be used as the structure of the soft magnetic layer; however, it is preferable to use a multi-layer structure from the viewpoint of improving the recording and play back characteristics. It is preferable that the soft magnetic layer which has the multi-layer structure is provided with a first soft magnetic layer, an intermediate layer, and a second soft magnetic layer, in which the intermediate layer is provided between the first soft magnetic layer and the second soft magnetic layer. In a case where the magnetic recording medium is further provided with the soft magnetic layer, it is preferable for a lower coating layer to be provided between at least one out of between the base material and the soft magnetic layer and between the soft magnetic layer and the recording layer.

In the present application, it is preferable that the intermediate layer includes Ru. Ru is preferably included in a form of a Ru single body, a Ru alloy, or a Ru oxide; however, the form is not particularly limited thereto. It is preferable that the lower coating layer includes Ti or Ni. Examples of a lower coating layer which has such a configuration include a single layer which includes a Ti alloy, a single layer which includes an Ni alloy, or a laminated film thereof; however, the configuration is not particularly limited thereto.

In the present application, from the viewpoint of improvement in productivity, it is preferable that the lower coating layer and the recording layer are continuously film-formed by a roll to roll method. In a case where the magnetic recording medium is provided with at least one type out of an intermediate layer, a lower coating layer, and a CAP layer, it is preferable that this layer is also continuously film-formed with the lower coating layer and the recording layer by a roll to roll method. It is preferable to use a physical deposition method such as a sputtering method as the film-forming method.

Description will be given of embodiments of the present application in the following order with reference to the diagrams. Here, the same reference numerals are used for the same or corresponding portions in all the diagrams of the following embodiments.

1. First Embodiment (Example of Magnetic Recording Medium)
  1.1 Configuration of Magnetic Recording Medium
  1.2 Configuration of Sputtering Apparatus
  1.3 Method for Manufacturing Magnetic Recording Medium
  1.4 Effects
  1.5 Modified Examples
2. Second Embodiment (Example of Magnetic Recording Medium)
  2.1 Configuration of Magnetic Recording Medium
  2.2 Effects
  2.3 Modified Examples
3. Third Embodiment (Example of Magnetic Recording Medium)
  3.1 Configuration of Magnetic Recording Medium
  3.2 Effects
  3.3 Modified Examples 1. First Embodiment In the first embodiment, description will be given of an example of a magnetic recording medium, where a lower layer of a lower coating layer is a base material and a value of an orientation strength $\Delta\theta_{50}$ of a recording layer is set within a range of 5° or more to less than 10° by adjusting an arithmetic average roughness Ra of the base material surface, that is, the arithmetic average roughness Ra of an interface between the base material and the lower coating layer.

1.1 Configuration of Magnetic Recording Medium

As shown in FIG. 1, a magnetic recording medium according to a first embodiment of the present application is a so-called single layer perpendicular magnetic recording medium and is provided with a base material 11, a lower coating layer 12 which is provided on the surface of the base material 11, and a recording layer 13 which is provided on the surface of the lower coating layer 12. The magnetic recording medium may be further provided with a protective layer 14 which is provided on a surface of the recording layer 13 and a top coat layer 15 which is provided on a surface of the protective layer 14 according to necessity.

The lower coating layer 12 and the recording layer 13 are film-formed, for example, by a physical deposition method. As the physical deposition method, a sputtering method is preferable from the viewpoints of productivity or the like. It is preferable that the lower coating layer 12 and the recording layer 13 are continuously film-formed by a roll to roll method. Here, in the present specification, a magnetic recording medium which does not have a soft magnetic underlayer is referred to as a "single layer perpendicular magnetic recording medium" and a magnetic recording medium which has a soft magnetic underlayer is referred to as a "two-layer perpendicular magnetic recording medium".

The magnetic recording medium is suitable for use as a storage media for data archives for which the demand is expected to increase more and more in the future. The magnetic recording medium is able to realize, for example, a surface recording density of 10 times or more the current coating-type magnetic tape for storage, that is, a surface recording density of 50 Gb/in$^2$. In a case of configuring a general linear recording type data cartridge using a magnetic recording medium which has such a surface recording density, it is possible to record with a large capacity of 50 TB or more for each roll in a data cartridge. The magnetic recording medium is suitable for use for a recording and play back apparatus which uses a ring type recording head and a giant magnetoresistive (GMR) type play back head.

It is preferable that a magnetic characteristic Hc (holding power) in a perpendicular direction of the magnetic recording medium which is measured using the Kerr effect is 3000 Oe or more to 5500 Oe or less and that a magnetic characteristic Rs (a squareness ratio) in a perpendicular direction is 85% or more. By the magnetic characteristic Hc and the magnetic characteristic Rs being within this range, it is possible to obtain favorable recording and play back characteristics.

Base Material

The base material 11 which is a support body is, for example, a long film and has a surface which has a longitudinal direction (an MD direction) and a short direction (a TD direction). It is preferable to use a nonmagnetic base material which has flexibility as the base material 11. It is possible to use, for example, a flexible polymer resin material which is used for a normal magnetic recording medium as a material of a nonmagnetic base material. Specific examples of such a polymer material include polyesters, polyolefins, cellulose derivatives, vinyl-based resins, polyimides, polyamides, polycarbonate, or the like.

It is preferable that the base material 11 has an uneven surface which has fine unevenness. It is preferable that each layer such as the lower coating layer 12 and the recording layer 13 has a shape which follows the uneven surface. It is preferable that the base material 11 and the lower coating layer 12 are provided to be adjacent and that the arithmetic average roughness Ra of a surface (a film-forming surface) of the base material 11 which is a lower layer of the lower coating layer 12, that is, the arithmetic average roughness Ra of an interface between the base material 11 and the lower coating layer 12 is 0.4 nm or more to 1.0 nm or less. Due to this, in X-ray diffraction peaks of the magnetic recording medium, it is possible to set a value of $\Delta\theta_{50}$ where a diffraction peak of magnetic atoms which are included in the recording layer 13 is measured by a locking curve method within a range of 5° or more to less than 10°. However, the method for setting the value of $\Delta\theta_{50}$ within a range of 5° or more to less than 10° is not limited to the method for adjusting the surface property of the base material 11 described above and methods other than this may be used.

Lower Coating Layer

The lower coating layer 12 is provided between the base material 11 and the recording layer 13. The lower coating layer 12 preferably includes an alloy of Ti or Ni and is, for example, a single layer which includes a Ti alloy, a single layer which includes a Ni alloy, or a laminated film where these are laminated.

It is preferable that the lower coating layer 12 which includes a Ti alloy includes an alloy which includes Ti and Cr and has an amorphous state. In addition, oxygen (O) may be further included in the alloy. The oxygen is impure oxygen which is included in a small amount inside the lower coating layer 12 when film-forming the lower coating layer 12 by a film-forming method such as a sputtering method. Here, "alloy" has the meaning of at least one type of a solid solution, a eutectic body, an intermetallic compound, or the like which includes Ti and Cr. "Amorphous state" has the meaning that a halo is observed by an electron diffraction method and that a crystal structure may not be specified.

The lower coating layer 12 which includes an alloy which includes Ti and Cr and has an amorphous state has an effect of suppressing the influence of $O_2$ gas, $H_2O$, or the like which is adsorbed on the base material 11 and of forming a metallic smooth surface on the surface of the base material 11 by easing unevenness of the surface of the base material 11. Due to this effect, the perpendicular orientation of the recording layer 13 is increased. Here, when the state of the lower coating layer 12 is a crystal state, the column shape accompanying the crystal growth is clear, the unevenness of the surface of the base material 11 is increased, and there is a concern that the crystal orientation of the recording layer 13 will deteriorate.

The ratio of oxygen (O) with respect to the total amount of Ti, Cr, and O which are included in the lower coating layer 12 is preferably 15 atomic % (at %) or less, more preferably 10 atomic % or less. When the ratio of oxygen exceeds 15 atomic %, $TiO_2$ crystals are generated and thus there is a concern that the orientation of the recording layer 13 will greatly decrease so as to have an influence on crystal nucleation of the recording layer 13 which is formed on a surface of the lower coating layer 12.

The ratio of Ti with respect to the total amount of Ti and Cr which are included in the lower coating layer 12 is preferably within a range of 30 atomic % or more to 100 atomic % or less, more preferably 50 atomic % or more to 100 atomic % or less. When the ratio of Ti is less than 30%, a (100) surface of a body-centered cubic lattice (bcc) structure of Cr is orientated and there is a concern that the orientation of the recording layer 13 which is formed on a surface of the lower coating layer 12 will decrease.

Here, it is possible to determine the ratio of the elements described above as follows. Etching is performed using an ion beam from the top coat layer 15 side of the magnetic recording medium, analysis is carried out using Auger electron spectroscopy with regard to the top surface of the etched lower coating layer 12, and an average atomic number ratio with respect to the film thickness is the ratio of the elements described above. In detail, analysis is performed with regard to the three elements of Ti, Cr, and O and the element content is identified according to the percentage ratios thereof.

The alloy which is included in the lower coating layer 12 may further include an element other than Ti and Cr as an additional element. Examples of the additional element include one or more types of elements which are selected from a group formed of, for example, Nb, Ni, Mo, Al, W, and the like.

It is preferable that the lower coating layer 12, which includes a Ni alloy, includes an alloy which includes Ni and W. In this case, the lower coating layer 12 may have an amorphous state.

Recording Layer

The value of $\Delta\theta_{50}$ where a diffraction peak of magnetic atoms which are included in the recording layer 13 which is a magnetic layer in X-ray diffraction peaks of the magnetic recording medium is measured by a locking curve method is 5° or more to less than 10°. When this value is less than 5°, reliability decreases since the sliding performance decreases. On the other hand, when the value is 10° or more, the recording and play back characteristics decrease since the orientation of crystal particles which are included in the recording layer 13 decreases.

Examples of a method for setting the value of $\Delta\theta_{50}$ within a range of 5° or more to less than 10° include a method for adjusting, for example, the arithmetic average roughness Ra of a surface of the base material 11 which is a lower layer of the lower coating layer 12 which has a close relationship with orientation of the magnetic crystal particles, that is, the arithmetic average roughness Ra of an interface between the base material 11 and the lower coating layer 12. However, a method for setting the value of $\Delta\theta_{50}$ within a range of 5° or more to less than 10° is not limited to the method for adjusting the surface property of the base material 11 described above and methods other than this may be used.

The average thickness of the recording layer 13 is preferably 10 nm or more and more preferably 10 nm or more to 30 nm. When the average thickness is less than 10 nm, the influence of thermal agitation is great due to the size of the magnetic particles being small and it is difficult to hold the recording magnetization. On the other hand, when the average thickness exceeds 30 nm, the SNR decreases due to an increase in the noise.

From the viewpoint of increasing the recording density, it is preferable that the recording layer 13 is a perpendicular recording layer. The perpendicular recording layer is preferably a granular magnetic layer which includes a Co-based alloy. The granular magnetic layer is configured by strongly magnetic crystal particles which includes a Co-based alloy and a nonmagnetic particle boundary (a nonmagnetic body) which surrounds the strongly magnetic crystal particles. In more detail, the granular magnetic layer is configured by columns (columnar crystal) which include a Co-based alloy and a nonmagnetic particle boundary (for example, an oxide such as $SiO_2$) which surrounds the columns and magnetically separates each column. In this structure, it is possible to configure the recording layer 13 which has a structure where each column is magnetically separated.

A Co-based alloy has a hexagonal close packing (hcp) structure and the c axis thereof is orientated in the perpendicular direction (the film thickness direction) with respect to the film surface. It is preferable to use a CoCrPt-based alloy which contains at least Co, Cr, and Pt as the Co-based alloy. The CoCrPt-based alloy is not particularly limited and the CoCrPt-based alloy may further include an additional element. Examples of the additional elements include one or more types of elements which are selected from a group formed of, for example, Ni, Ta, and the like.

The nonmagnetic particle boundary which surrounds the strongly magnetic crystal particles includes a nonmagnetic metallic material. Here, the metals include semi-metals. It is possible to use at least one of a metal oxide and a metal nitride as the nonmagnetic metallic material and it is preferable to use a metal oxide from the viewpoint of stably maintaining a granular structure. Examples of metal oxides include a metal oxide which includes at least one or more types of elements which are selected from a group formed of Si, Cr, Co, Al, Ti, Ta, Zr, Ce, Y, Hf, and the like and a metal oxide which includes at least a Si oxide (that is, $SiO_2$) is preferable. Specific examples thereof include $SiO_2$, $Cr_2O_3$, $CoO$, $Al_2O_3$, $TiO_2$, $Ta_2O_5$, $ZrO_2$, $HfO_2$, or the like. Examples of metal nitrides include a metal nitride which includes at least one or more types of elements which are selected from a group formed of Si, Cr, Co, Al, Ti, Ta, Zr, Ce, Y, Hf, and the like. Specific examples thereof include SiN, TiN, AlN, or the like. In order to more stably maintain a granular structure, it is preferable that a nonmagnetic particle boundary includes a metal oxide out of a metal nitride and a metal oxide.

It is preferable that the recording layer 13 has the average composition shown in the following formula from the viewpoint of realizing further improvement of the signal-noise ratio (SNR). This is because it is possible to suppress an influence of a demagnetizing field and realize a saturation magnetization quantity Ms which is able to secure a sufficient play back output, and it is possible to secure a high SNR due to this.

$(Co_xPt_yCr_{100-x-y})_{100-z}$—$(SiO_2)_z$ (here, in the formula, x, y, and z are respectively values within a range of $69 \leq x \leq 72$, $12 \leq y \leq 16$, and $9 \leq z \leq 12$).

Here, it is possible to obtain the composition described above as follows. Etching is performed using an ion beam from the top coat layer 15 side of a magnetic recording medium, analysis is carried out by Auger electron spectroscopy with regard to the top surface of the etched recording layer 13, and an average atomic number ratio with respect to the film thickness is determined as the composition described above. In detail, analysis is performed with regard to the five elements of Co, Pt, Cr, Si, and O and the element content is identified according to the percentage ratios thereof.

It is preferable that the average particle diameter of crystal particles which are included in the recording layer 13 is 6 nm or more to 8 nm or less. When the average particle diameter is less than 6 nm, the influence of thermal agitation is great and it is difficult to hold the recording magnetization. On the other hand, when the average particle diameter exceeds 8 nm, exchange interaction is strong due to the intervals between grains being narrow and the noise increases.

A magnetic recording medium according to the present embodiment is a single layer magnetic recording medium which does not have an underlayer (a soft magnetic underlayer) which includes a soft magnetic material; however, in this type of magnetic recording medium, there is a tendency for sufficient recording in the vertical direction to be difficult when the influence of a demagnetizing field which is caused by the recording layer 13 is great in the vertical direction. Since the demagnetizing field becomes large in proportion to the saturation magnetization quantity Ms of the recording layer 13, it is desirable to make the saturation magnetization quantity Ms small in order to suppress the demagnetizing field. However, when the saturation magnetization quantity Ms is small, a residual magnetic quantity Mr is small and the play back output decreases. Accordingly, it is preferable to select a material which is included in the recording layer 13 from the viewpoint of obtaining both of suppression of the influence of the demagnetizing field (that is, reduction of the saturation magnetization quantity Ms), and the residual magnetic quantity Mr being able to secure sufficient play back output. In the average composition in the above formula, it is possible to obtain both of these characteristics and to secure a high SNR.

Protective Layer

The protective layer 14 includes, for example, a carbon material or silicon dioxide ($SiO_2$) and it is preferable to include a carbon material from the viewpoint of the film strength of the protective layer 14. Examples of carbon materials include graphite, diamond-like carbon (DLC), diamonds, or the like.

Top Coat Layer

The top coat layer 15 includes, for example, a lubricant. It is possible to use, for example, a silicone-based lubricant, a hydrocarbon-based lubricant, a fluorinated hydrocarbon-based lubricant, or the like as a lubricant.

1.2 Configuration of Sputtering Apparatus

Figure 2:
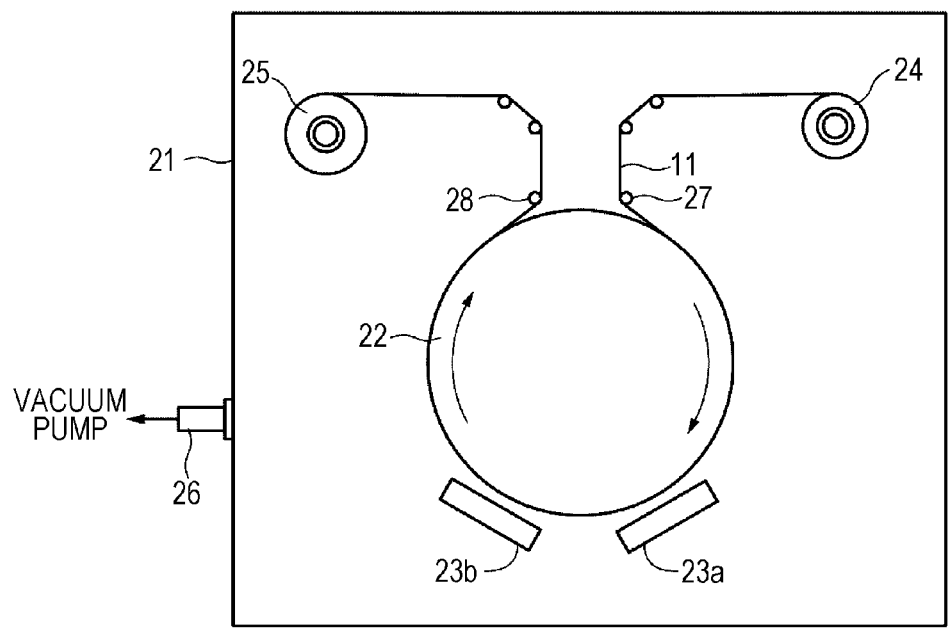
FIG. 2 is a schematic diagram which shows one example of a configuration of a sputtering apparatus which is used for manufacturing a magnetic recording medium according to the first embodiment of the present application.

FIG. 2 is a schematic diagram which shows one example of a configuration of a sputtering apparatus which is used for manufacturing a magnetic recording medium according to the first embodiment of the present application. The sputtering apparatus is a continuous winding type sputtering apparatus which is used for film-forming the lower coating layer 12 and the recording layer 13. As shown in FIG. 2, the sputtering apparatus is provided with a film-forming chamber 21, a drum 22 which is a metal can (a rotating body), cathodes 23a and 23b, a supply reel 24, a winding reel 25, and a plurality of guide rolls 27 and 28. The sputtering apparatus is, for example, a direct current (DC) magnetron sputtering type apparatus; however, the sputtering method is not limited to this type.

The film-forming chamber 21 is connected with a vacuum pump, which is not shown in the diagram, via an exhaust port 26, and the atmosphere inside the film-forming chamber 21 is set to a predetermined degree of vacuum by the vacuum pump. The drum 22, the supply reel 24, and the winding reel 25 are arranged inside the film-forming chamber 21 with a configuration where rotation is possible. Inside the film-forming chamber 21, the plurality of guide rolls 27 for guiding transportation of the base material 11 between the supply reel 24 and the drum 22 are provided and the plurality of guide rolls 28 for guiding transportation of the base material 11 between the drum 22 and the winding reel 25 are provided. The base material 11 which is wound out from the supply reel 24 is wound by the winding reel 25 via the guide roll 27, the drum 22, and the guide roll 28 during sputtering. The drum 22 has a columnar shape and the base material 11 with an elongated rectangular shape is transported along a peripheral surface of the columnar surface shape of the drum 22. A cooling mechanism which is not shown in the diagram is provided in the drum 22 and is cooled to, for example, approximately −20° C. during sputtering. The plurality of cathodes 23a and 23b are arranged opposing the peripheral surface of the drum 22 inside the film-forming chamber 21. Targets are respectively set to the cathodes 23a and 23b. In detail, targets for film-forming the lower coating layer 12 and the recording layer 13 are respectively set in the cathodes 23a and 23b. A plurality of types of films, that is, the lower coating layer 12 and the recording layer 13 are simultaneously film-formed by the cathodes 23a and 23b with one transportation of the base material 11.

The atmosphere of the film-forming chamber 21 during sputtering is set, for example, to approximately $1×10^{-5}$ Pa to $5×10^{-5}$ Pa. It is possible to control the film thickness and characteristics (for example, magnetic characteristics) of the lower coating layer 12 and the recording layer 13 by adjusting a tape line speed for winding the base material 11, the pressure (sputtering gas pressure) of Ar gas which is introduced during sputtering, the supplied electrical power, and the like. It is preferable that the tape line speed is within a range of approximately 1 m/min to 10 m/min. It is preferable that the sputtering gas pressure is within a range of approximately 0.1 Pa to 5 Pa. It is preferable that the supplied electrical power amount is within a range of approximately 30 $mW/mm^2$ to 150 $mW/mm^2$.

In the sputtering apparatus which has the configuration described above, it is possible to continuously film-form the lower coating layer 12 and the magnetic recording layer 13 using a roll to roll method.

1.3 Method for Manufacturing Magnetic Recording Medium

It is possible for the magnetic recording medium according to the first embodiment of the present application to be manufactured, for example, as follows.

Firstly, using the sputtering apparatus shown in FIG. 2, the lower coating layer 12 and the recording layer 13 are formed on the base material 11. In detail, the film-forming is carried out as follows. Firstly, the film-forming chamber 21 is vacuumed to a predetermined pressure. After that, the lower coating layer 12 and the recording layer 13 are sequentially film-formed on a surface of the base material 11 which moves by carrying out sputtering on the targets which are set in the cathodes 23a and 23b while introducing a process gas such as Ar gas into the film-forming chamber 21.

Here, in the one process which winds out the base material 11 from the supply reel 24 to be wound onto the winding reel 25 via the drum 22, the recording layer 13 may be film-formed in a process where only the lower coating layer 12 is film-formed, the base material 11 is wound out from the winding reel 25 again, and wound onto the supply reel 24. However, since there is a concern about changes in quality in the surface state of the film when film-forming the lower coating layer 12 and the recording layer 13 in different moving processes in this manner, it is preferable to simultaneously film-form the lower coating layer 12 and the recording layer 13 in one moving process as described above.

Next, the protective layer 14 is formed on the surface of the recording layer 13. It is possible to use, for example, a chemical vapor deposition (CVD) method or a physical vapor deposition (PVD) method as a method for forming the protective layer 14.

Next, for example, a lubricant is coated on a surface of the protective layer 14, and the top coat layer 15 is formed. It is possible to use various types of coating methods, for example, such as gravure coating and dip coating as the lubricant coating method.

Due to the above, the magnetic recording medium shown in FIG. 1 is obtained.

1.4 Effects

In the magnetic recording medium according to the first embodiment, the value of $\Delta\theta_{50}$ is set to 5° or more to less than 10° by adjusting the arithmetic average roughness Ra of a surface of the base material 11 which has flexibility, that is, the arithmetic average roughness Ra of an interface between the base material 11 and the lower coating layer 12. Accordingly, it is possible to obtain both recording and play back characteristics and reliability.

1.5 Modified Examples

In the first embodiment described above, description was given of a configuration where the lower coating layer 12 and the recording layer 13 are sequentially laminated on the base material 11. However, the layer configuration of the magnetic recording medium is not limited thereto and another layer configuration may be adopted as long as the arithmetic average roughness Ra of a surface of the base material 11, that is, the arithmetic average roughness Ra of an interface between the base material 11 and the lower coating layer 12 is 0.4 nm or more to 1.0 nm or less. Below, description will be given of another layer configuration.

Modified Example 1

Figure 3A:
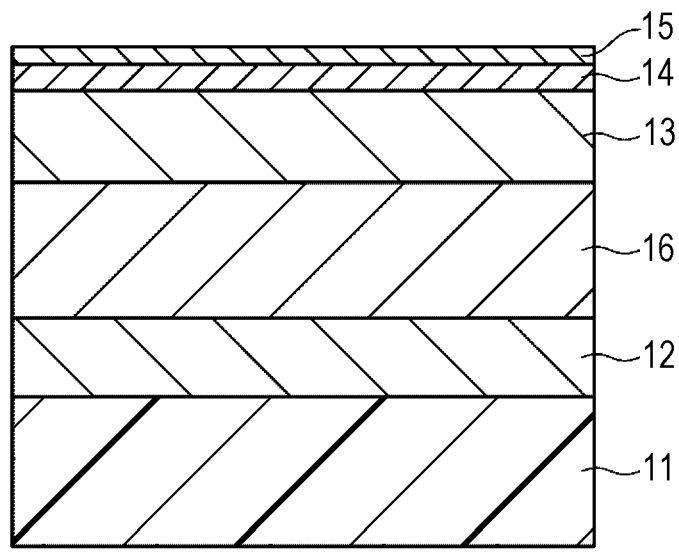
FIG. 3A is a cross-sectional diagram which schematically shows one example of a configuration of a magnetic recording medium according to modified example 1 of the first embodiment of the present application.

As shown in FIG. 3A, the magnetic recording medium may be further provided with an intermediate layer 16 between the lower coating layer 12 and the recording layer 13. It is preferable that the intermediate layer 16 have the same crystal structure as the recording layer 13. In a case where the recording layer 13 includes a Co-based alloy, it is preferable that the intermediate layer 16 includes a material which has the same hexagonal close packing (hcp) structure as a Co-based alloy and that a c axis of the structure is oriented in a perpendicular direction (that is, a film thickness direction) with respect to a film surface. This is because it is possible to increase the orientation of the recording layer 13 and to make the matching of lattice constants of the intermediate layer 16 and the recording layer 13 comparatively favorable. It is preferable to use a material which includes Ru as the material which has a hexagonal close packing (hcp) structure and in detail, an Ru single body, an Ru alloy, or an Ru oxide is preferable. Examples of the Ru oxide include a Ru alloy oxide such as Ru—SiO$_2$, Ru—TiO$_2$, or Ru—ZrO$_2$.

Here, the intermediate layer 16 is not limited to a single layer structure and may be a multi-layer structure with two or more layers. In a case where the intermediate layer 16 has a multi-layer structure, a plurality of the intermediate layers with the same composition and different film-forming conditions such as the sputtering conditions are used. For example, in a case where the intermediate layer 16 has a two-layer structure, the intermediate layer 16 is provided with a first intermediate layer (a lower side intermediate layer) and a second intermediate layer (an upper side intermediate layer). The first intermediate layer is provided on the lower coating layer 12 side and the second intermediate layer is provided on the recording layer 13 side.

It is possible to use, for example, the same material as the intermediate layer 16 described above as the material of the first and second intermediate layers. However, the desired effects in each of the first and second intermediate layers are different and for this reason, the respective film-forming conditions are different. That is, it is preferable that the first intermediate layer has a film structure with high crystal orientation and that the second intermediate layer has a film structure which promotes the granular structure of the recording layer 13 which is the upper layer thereof.

The value of $\Delta\theta_{50}$ where a diffraction peak of atoms which are included in the intermediate layer 16 in X-ray diffraction peaks of the magnetic recording medium is measured by a locking curve method is preferably 4° or more to 9° or less. Due to this, it is possible to set the value of $\Delta\theta_{50}$ of the recording layer 13 which is provided on the intermediate layer 16 to 5° or more to less than 10°. That is, it is possible to obtain both recording and play back characteristics and reliability.

Modified Example 2

Figure 3B:
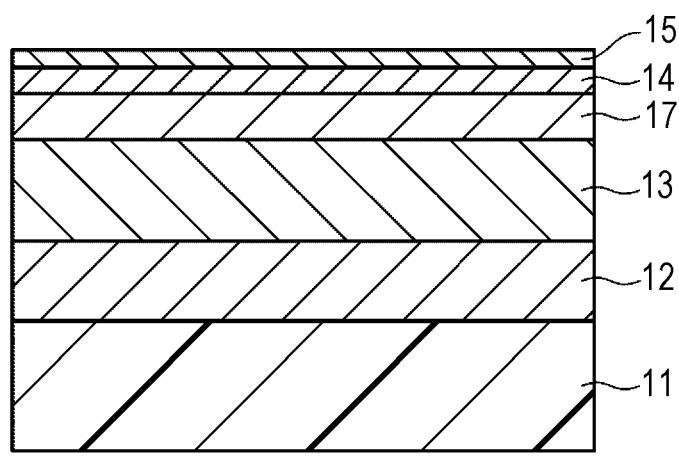
FIG. 3B is a cross-sectional diagram which schematically shows one example of a configuration of a magnetic recording medium according to modified example 2 of the first embodiment of the present application.

As shown in FIG. 3B, the magnetic recording medium may be further provided with a CAP layer (a stack layer) 17 between the recording layer 13 and the protective layer 14. A laminated structure formed of the recording layer 13 which has a granular structure and the CAP layer 17 which is provided to be adjacent to the recording layer 13 is generally referred to as coupled granular continuous (CGC). It is preferable that the film thickness of the CAP layer 17 is 4 nm or more to 12 nm or less. It is possible to obtain more favorable recording and play back characteristics by selecting the film thickness of the CAP layer 17 within a range of 4 nm or more to 12 nm or less. It is preferable that the CAP layer 17 includes a CoCrPt-based material. Examples of the CoCrPt-based material include CoCrPt, CoCrPtB, a material where a metal oxide is further added to these materials (CoCrPt-metal oxide or CoCrPtB-metal oxide), and the like. It is possible to use at least one type which is selected from a group formed of, for example, Si, Ti, Mg, Ta, Cr, and the like as a metal oxide to be added. Specific examples thereof include SiO$_2$, TiO$_2$, MgO, Ta$_2$O$_5$, Cr$_2$O$_3$, a mixture of two or more types thereof, and the like.

In a case of adopting a structure where the CAP layer 17 is provided on the recording layer 13 which has a granular structure, it is possible to facilitate recording by generating a magnetic bond due to exchange interaction between the recording layer 13 and the CAP layer 17 and due to the effect thereof, making the inclination of a M-H loop steep in the vicinity of Hc. Normally, an increase in noise is observed in a case of making an inclination of a M-H loop steep by only the recording layer 13; however, in a case of the structure, since a structure of recording which generates noise is able to maintain a low noise structure, it is possible to realize a structure which has low noise and which facilitates recording.

Modified Example 3

Figure 4:
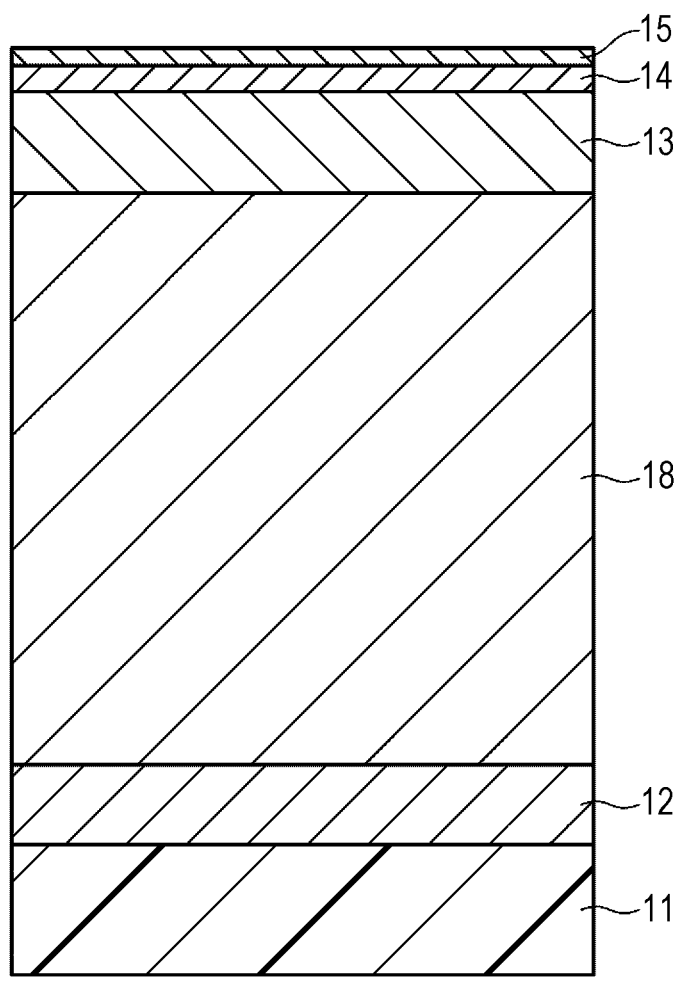
FIG. 4 is a cross-sectional diagram which schematically shows one example of a configuration of a magnetic recording medium according to a modified example 3 of the first embodiment of the present application.

As shown in FIG. 4, a magnetic recording medium is a so-called two-layer perpendicular magnetic recording medium and may be further provided with the soft magnetic underlayer (referred to below as "SUL") 18 with a single layer structure between the lower coating layer 12 and the recording layer 13. The magnetic recording medium is favorably used for a recording and play back apparatus which uses a single pole type (SPT) recording head and a tunnel magnetoresistive (TMR) type play back head.

The film thickness of the SUL 18 is preferably 40 nm or more, more preferably 40 nm or more to 140 nm or less. When the film thickness is less than 40 nm, there is a tendency for the recording and play back characteristics to decrease. On the other hand, when the film thickness exceeds 140 nm, the decrease in the crystal orientation of the recording layer 13 due to coarsening of the crystal particles of the SUL 18 is remarkable, the film-forming time of the SUL 18 is longer, and there is a concern that this will lead to a decrease in productivity. The SUL 18 includes a soft magnetic material in an amorphous state. It is possible to use, for example, a Co-based material, a Fe-based material, or the like as the soft magnetic material. Examples of the Co-based material include CoZrNb, CoZrTa, CoZrTaNb, and the like. Examples of the Fe-based material include FeCoB, FeCoZr, FeCoTa, and the like.

Since the SUL 18 has an amorphous state, the SUL 18 does not play a role of promoting epitaxial growth in a layer which is formed on the SUL 18; however, there is a demand to not disturb the crystal orientation of the recording layer 13 which is formed on the SUL 18. For that, it is necessary to have a minute structure where the soft magnetic material does not form a column; however, in a case where the influence of degassing such as water from the base material 11 is large, there is a concern that the soft magnetic material will be coarsened and disturb the crystal orientation of the recording layer 13 which is formed on the SUL 18. By providing the lower coating layer 12 on the surface of the base material 11, it is possible to suppress these influences. In particular, in a case of using a polymer material film, in which a large amount of water or gasses such as oxygen are absorbed, as the base material 11, it is desirable that the lower coating layer 12 is provided in order to suppress these influences.

The magnetic recording medium plays a role in assisting the generation of a sharp head magnetic field by suppressing magnetic field reduction in the generation of a magnetic pole which is generated on a top layer of the recording layer 13 and guiding a head magnetic flux into the SUL 18 by providing the SUL 18 under the recording layer 13 which is a perpendicular magnetic layer. In addition, since the lower coating layer 12 is provided between the base material 11 and the SUL 18, it is possible to suppress coarsening a soft magnetic material which is included in the SUL 18. That is, it is possible to suppress disorders in the crystal orientation in the lower coating layer 12. Accordingly, it is possible to realize favorable recording and play back characteristics in a magnetic recording medium which has a high surface recording density.

Modified Example 4

Figure 5:
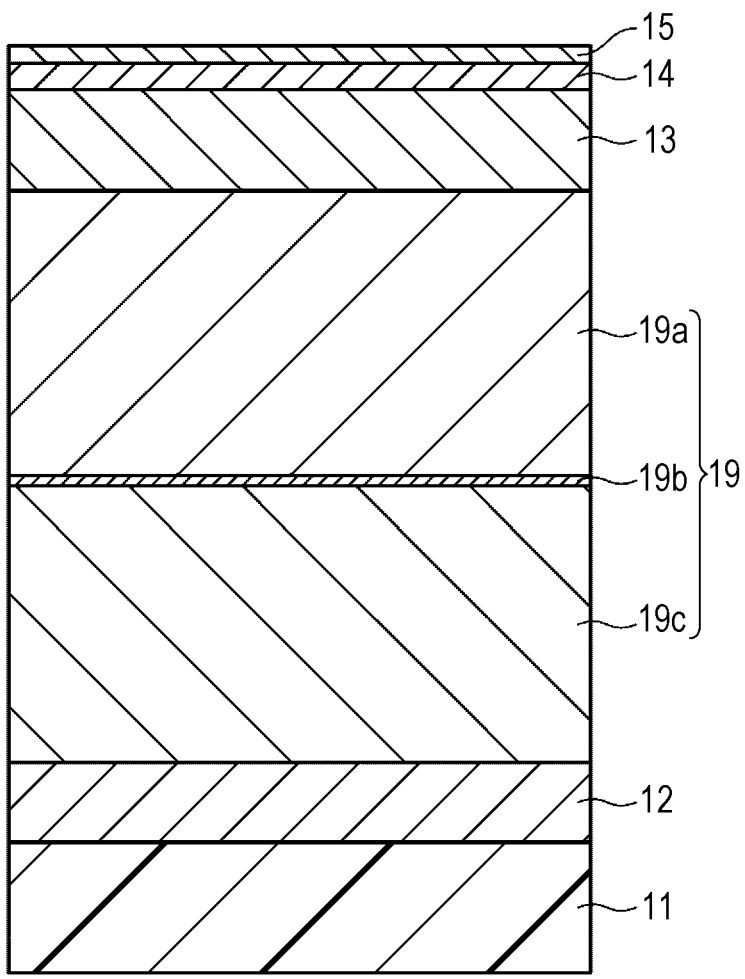
FIG. 5 is a cross-sectional diagram which schematically shows one example of a configuration of a magnetic recording medium according to modified example 4 of the first embodiment of the present application.

As shown in FIG. 5, a magnetic recording medium may be provided with an antiparallel coupled SUL (referred to below as "APC-SUL") 19 which is a soft magnetic underlayer with a multi-layer structure instead of the soft magnetic underlayer 18 with a single layer structure shown in FIG. 4.

The APC-SUL 19 has a structure where two soft magnetic layers 19a and 19c are laminated via a thin intermediate layer 19b and magnetization is actively coupled in antiparallel using exchange coupling via the intermediate layer 19b. It is preferable that the film thicknesses of the soft magnetic layers 19a and 19c are substantially the same. The total film thickness of the soft magnetic layers 19a and 19c is preferably 40 nm or more, more preferably 40 nm or more to 70 nm or less. When the film thickness is less than 40 nm, there is a tendency for the recording and play back characteristics to decrease. On the other hand, when the film thickness exceeds 70 nm, the film-forming time of the APC-SUL 19 is longer and there is a concern that this will lead to a decrease in productivity. It is preferable that the material of soft magnetic layers 19a and 19c is the same material and it is possible to use the same material as the SUL 18 in modified example 3 as the material. The film thickness of the intermediate layer 19b is, for example, 0.8 nm or more to 1.4 nm or less, preferably 0.9 nm or more to 1.3 nm or less, and more preferably approximately 1.1 nm. It is possible to obtain more favorable recording and play back characteristics by selecting the film thickness of the intermediate layer 19b within a range of 0.9 nm or more to 1.3 nm or less. Examples of a material of the intermediate layer 19b include V, Cr, Mo, Cu, Ru, Rh, Re, and the like, and Ru is particularly preferable.

Since the APC-SUL 19 is used in the magnetic recording medium, the soft magnetic layer 19a which is an upper layer section and the soft magnetic layer 19c which is a lower layer section are exchange coupled in antiparallel and the total magnetic quantity of the upper and lower layers in a residual magnetic state is zero. Due to this, it is possible to suppress generation of noise spikes which is generated in a case where the magnetic domain inside the APC-SUL 19 moves. Accordingly, it is possible to further improve recording and play back characteristics.

2. Second Embodiment

In the second embodiment, description will be given of an example of a magnetic recording medium, where a lower layer of a lower coating layer is a SUL and the value of the orientation strength $\Delta\theta_{50}$ of a recording layer is set within a range of 5° or more to less than 10° by adjusting the arithmetic average roughness Ra of the SUL surface, that is, the arithmetic average roughness Ra of an interface between a SUL and the lower coating layer.

2.1 Configuration of Magnetic Recording Medium

Figure 6:
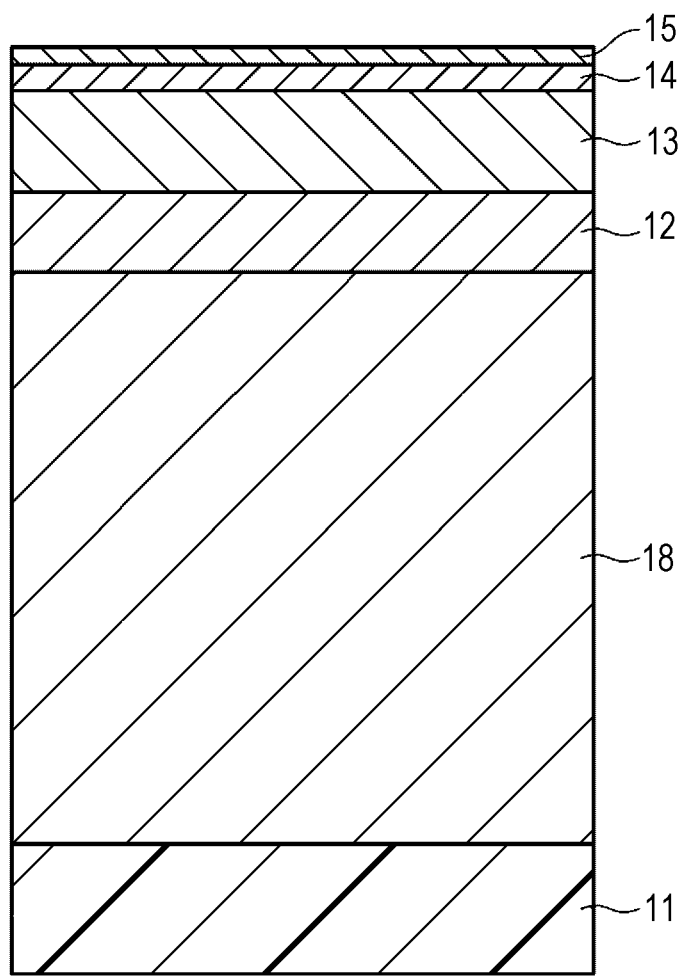
FIG. 6 is a cross-sectional diagram which schematically shows one example of a configuration of a magnetic recording medium according to a second embodiment of the present application.

As shown in FIG. 6, the magnetic recording medium according to the second embodiment of the present application is a so-called two-layer perpendicular magnetic recording medium and is different from the magnetic recording medium according to the first embodiment in the point that the SUL 18 is provided between the base material 11 and the lower coating layer 12.

The SUL 18 and the lower coating layer 12 are provided to be adjacent and the arithmetic average roughness Ra of a surface (a film-forming surface) of the SUL 18, that is, the arithmetic average roughness Ra of an interface between the SUL 18 and the lower coating layer 12 is 0.4 nm or more to 1.0 nm or less. Due to this, it is possible for the value of $\Delta\theta_{50}$ where a diffraction peak of magnetic atoms which are included in the recording layer 13 is measured by a locking curve method in X-ray diffraction peaks of a magnetic recording medium to be set within a range of 5° or more to less than 10°. However, a method for setting the value of $\Delta\theta_{50}$ within a range of 5° or more to less than 10° is not limited to the method for adjusting the surface property of the SUL 18 described above and a method other than this may be used.

In the second embodiment, the arithmetic average roughness Ra of an interface between the SUL 18 and the lower coating layer 12 may be 0.4 nm or more to 1.0 nm or less and the arithmetic average roughness Ra of the surface of the base material 11 may not be set within a range of 0.4 nm or more to 1.0 nm or less.

Examples of a method for adjusting the surface property of the SUL 18 include (1) a method for adjusting the surface property of the base material 11 which is a nonmagnetic support body and (2) a method for adjusting input sputtering electric power when film-forming the SUL 18. There is a relationship with a phenomenon where, after sputtering particles reach the base material 11, the sputtering particles move around on the base material 11 (migration) due to the kinetic energy and that a film, which is smoother and has higher crystallinity as the migration phenomenon is greater, is formed. In a case where the surface property of the base material 11 is rough, the kinetic energy of the sputtering particles attenuates due to the influence of the unevenness of the surface and sufficient migration may not be obtained. In addition, also in a case where the input sputtering electric power is small, due to the kinetic energy of the sputtering particles being small in the same manner, sufficient migration may not be obtained in the sputtering particles. It is possible to change the surface property of the sputtering film by controlling these parameters.

The second embodiment is the same as the first embodiment other than the points described above.

2.2 Effects

In the magnetic recording medium according to the second embodiment, the value of $\Delta\theta_{50}$ is set to 5° or more to less than 10° by adjusting the arithmetic average roughness Ra of an interface between the SUL 18 and the lower coating layer 12 to 0.4 nm or more to 1.0 nm or less. Accordingly, it is possible to obtain both recording and play back characteristics and reliability.

2.3 Modified Example

In the second embodiment described above, description was given of a configuration where the SUL 18, the lower coating layer 12, and the recording layer 13 are sequentially laminated on the surface of the base material 11. However, the layer configuration of the magnetic recording medium is not limited thereto as long as the arithmetic average roughness Ra of an interface between the SUL 18 and the lower coating layer 12 is 0.4 nm or more to 1.0 nm or less and other layer configurations may be adopted. Below, description will be given of another layer configuration.

The magnetic recording medium may be further provided with an intermediate layer between the lower coating layer 12 and the recording layer 13. The magnetic recording medium may be further provided with a CAP layer (a stack layer) between the recording layer 13 and the protective layer 14. Each of the intermediate layer and the CAP layer is the same as in modified examples 1 and 2 of the first embodiment.

The magnetic recording medium may be provided with an APC-SUL which is a soft magnetic underlayer with a multilayer structure instead of the soft magnetic underlayer 18 with a single layer structure shown in FIG. 6. The arithmetic average roughness Ra of the surface (the film-forming surface) of the APC-SUL, that is, the arithmetic average roughness Ra of an interface between the APC-SUL and the lower coating layer 12 is 0.4 nm or more to 1.0 nm or less. The APC-SUL is the same as modified example 4 of the first embodiment in other respects.

3. Third Embodiment

In the third embodiment, description will be given of an example of a magnetic recording medium, which is provided with a first and second lower coating layers, where a lower layer of the first lower coating layer is a base material, a lower layer of the second lower coating layer is an SUL, and the value of $\Delta\theta_{50}$ is set within a range of 5° or more to less than 10° by adjusting the arithmetic average roughness Ra of an interface between the SUL and the second lower coating layer.

3.1 Configuration of Magnetic Recording Medium

Figure 7:
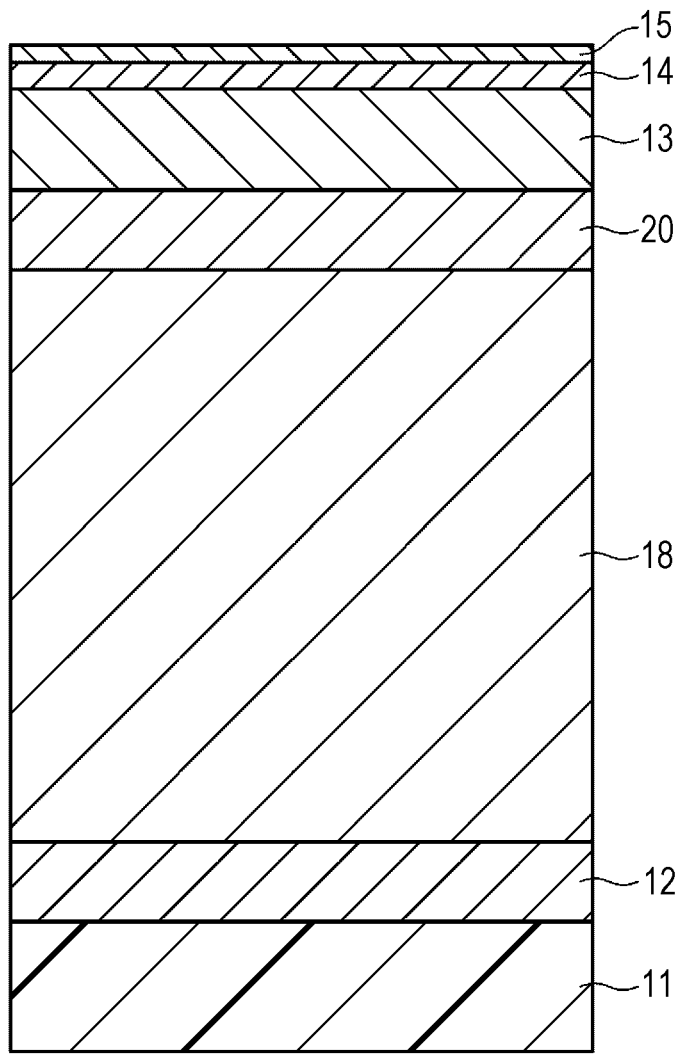
FIG. 7 is a cross-sectional diagram which schematically shows one example of a configuration of a magnetic recording medium according to a third embodiment of the present application.

As shown in FIG. 7, a magnetic recording medium according to the third embodiment of the present application is a so-called two-layer perpendicular magnetic recording medium and is different from the magnetic recording medium according to the first embodiment in the point that the SUL 18 and a lower coating layer 20 are further provided between the lower coating layer 12 and the recording layer 13. The SUL 18 is provided on the lower coating layer 12 side and the lower coating layer 20 is provided on the recording layer 13 side.

The arithmetic average roughness Ra of an interface between the SUL 18 and the lower coating layer 20 is 0.4 nm or more to 1.0 nm or less. The lower coating layer 20 is the same as the lower coating layer 12 in the first embodiment.

The third embodiment is the same as the first embodiment other than the points described above.

3.2 Effects

In the third embodiment, the value of $\Delta\theta_{50}$ is set to 5° or more to less than 10° by adjusting the arithmetic average roughness Ra of an interface between the SUL 18 and the lower coating layer 20 to 0.4 nm or more to 1.0 nm or less. Accordingly, it is possible to obtain both recording and play back characteristics and reliability.

3.3 Modified Examples

In the third embodiment described above, description was given of a configuration where the lower coating layer 12, the SUL 18, a lower coating layer 20b, and the recording layer 13 are sequentially laminated on a surface of the base material 11. However, the layer configuration of a magnetic recording medium is not limited thereto as long as the arithmetic average roughness Ra of an interface between the SUL 18 and the lower coating layer 20 is 0.4 nm or more to 1.0 nm or less and other layer configurations may be adopted. Below, description will be given of another layer configuration.

The magnetic recording medium may be further provided with an intermediate layer between the lower coating layer 20 and the recording layer 13. The magnetic recording medium may be further provided with a CAP layer (a stack layer) between the recording layer 13 and the protective layer 14. Each of the intermediate layer and the CAP layer is the same as in modified examples 1 and 2 of the first embodiment.

The magnetic recording medium may be provided with an APC-SUL which is a soft magnetic underlayer with a multilayer structure instead of the SUL 18 with a single layer structure shown in FIG. 7. The APC-SUL is the same as in modified example 4 of the first embodiment other than that the arithmetic average roughness Ra of an interface between the APC-SUL and the lower coating layer 20 is 0.4 nm or more to 1.0 nm or less.

EXAMPLES

Below, detailed description will be given of the present application using examples; however, the present application is not only limited to these examples.

In the present embodiment, the "average thickness of the recording layer" and the "average particle diameter of crystal particles" are obtained as follows.

Average Thickness of Recording Layer

The average thickness of the recording layer is obtained as follows. A cross-sectional TEM image of a magnetic tape is imaged, the thickness of the recording layer is obtained at 20 points in a 100 nm length from the cross-sectional TEM image, and the average (the arithmetic average) thereof is obtained.

Average Particle Diameter of Crystal Particles

The average particle diameter of crystal particles which are included in the recording layer (granular recording layer) is obtained as follows. Firstly, a flat surface TEM image (×2 million) of a magnetic tape is imaged and the particle diameters of each of a plurality of columns (crystal particles)

which are included in the recording layer are obtained from the flat surface TEM image. Next, the average particle diameter of the crystal particles is obtained by simply averaging (arithmetically averaging) the plurality of obtained particle diameters. The number of particles is 100 or more.

Description will be given of examples of the present application in the following order.

i. Relationship between unevenness of base material surface and orientation strength $\Delta\theta_{50}$
ii. Relationship between unevenness of SUL surface and orientation strength $\Delta\theta_{50}$
iii. Relationship between layer structure and various types of characteristics i. Relationship Between Unevenness of a Base Material Surface and Orientation Strength $\Delta\theta_{50}$ Example 1-1, Comparative Examples 1-2 and 1-2

Preparation Process of Base Material

Firstly, three types of polymer films with different surface roughnesses were prepared as a nonmagnetic base material which has flexibility.

Film-Forming Process of Lower Coating Layer

Next, a 5 nm TiCr layer (a lower coating layer) was film-formed on a polymer film with the following film-forming conditions.
Sputtering method: DC magnetron sputtering method
Target: $Ti_{30}Cr_{70}$ target
Ultimate vacuum: $5\times10^{-5}$ Pa
Gas type: Ar
Gas pressure: 0.25 Pa Film-Forming Process of Recording Layer Next, a 14 nm (CoCrPt)—($SiO_2$) layer (a recording layer) was film-formed on a TiCr layer (a lower coating layer) with the following film-forming conditions.
Sputtering method: DC magnetron sputtering method
Target: $(Co_{75}Cr_{10}Pt_{15})_{90}$—$(SiO_2)_{10}$ target
Gas type: Ar
Gas pressure: 1.0 Pa Film-Forming Process of Protective Layer Next, a 5 nm carbon layer (a protective layer) was film-formed on a (CoCrPt)—($SiO_2$) layer (a recording layer) with the following film-forming conditions.
Sputtering method: DC magnetron sputtering method
Target: Carbon target
Gas type: Ar
Gas pressure: 1.0 Pa Film-forming Process of Top Coat Layer Next, a lubricant was coated on a protective layer and a top coat layer was film-formed on the protective layer.

As described above, a magnetic tape which is a perpendicular magnetic recording medium is obtained.

ii. Relationship Between Unevenness of SUL Surface and Orientation Strength $\Delta\theta_{50}$ Examples 2-1 and 2-2, Comparative Examples 2-1 and 2-2

Preparation Process of Base Material

Firstly, four types of polymer films with different surface roughnesses were prepared as a nonmagnetic base material which has flexibility.

Film-Forming Process of SUL

Next, an 80 nm CoZrNb layer was film-formed as an SUL with a single layer structure on a polymer film with the following film-forming conditions.
Sputtering method: DC magnetron sputtering method
Target: CoZrNb target
Gas type: Ar
Gas pressure: 0.1 Pa
Input electric power: 96 $mW/mm^2$ Film-Forming Process of Lower Coating Layer Next, a TiCr layer (a lower coating layer), a (CoCrPt)—($SiO_2$) layer (a recording layer), a carbon layer (a protective layer), and a top coat layer were laminated on a CoZrNb layer (SUL) in the same manner as in example 1-1.

Example 2-3

A magnetic tape was obtained in the same manner as example 2-1 apart from film-forming an APC-SUL instead of an SUL with a single layer structure. Below, description will be given of film-forming processes of each layer which configures an APC-SUL.

First Soft Magnetic Layer

Firstly, a 40 nm CoZrNb layer was film-formed on a TiCr layer (a lower coating layer) as a first soft magnetic layer with the following film-forming conditions.
Sputtering method: DC magnetron sputtering method
Target: CoZrNb target
Gas type: Ar
Gas pressure: 0.1 Pa
Input electric power: 96 $mW/mm^2$ Ru Intermediate Layer Next, an Ru layer (an intermediate layer) was film-formed in a range of 0.8 nm to 1.1 nm on a CoZrNb layer with the following film-forming conditions.
Sputtering method: DC magnetron sputtering method
Target: Ru target
Gas type: Ar
Gas pressure: 0.3 Pa Second Soft Magnetic Layer Next, a 40 nm CoZrNb layer was film-formed on an Ru layer (an intermediate layer) as a second soft magnetic layer with the following film-forming conditions.
Sputtering method: DC magnetron sputtering method
Target: CoZrNb target
Gas type: Ar
Gas pressure: 0.1 Pa
Input electric power: 96 $mW/mm^2$ Example 2-4

A magnetic tape was obtained in the same manner as in example 2-3 apart from being further provided with a film-forming process for the following lower coating layer after the preparation process of the polymer film and before the film-forming process of the SUL.

Film-Forming Process of Lower Coating Layer

A 5 nm TiCr layer was film-formed on a polymer film with the following film-forming conditions.
Sputtering method: DC magnetron sputtering method
Target: $Ti_{30}Cr_{70}$ target
Ultimate vacuum: $5\times10^{-5}$ Pa
Gas type: Ar
Gas pressure: 0.25 Pa Comparative Example 2-3

A magnetic tape was obtained in the same manner as in example 2-4 apart from changing the input electric power to 55 mW/mm² in the process of the first soft magnetic layer and the process of the second soft magnetic layer.

iii. Relationship Between Layer Structure and Various Types of Characteristics

Example 3-1

A magnetic tape was obtained in the same manner as in example 2-4 apart from being further provided with a film-forming process for the following intermediate layer after the film-forming process of the lower coating layer before the film-forming process of the recording layer.

Film-Forming Process of Intermediate Layer

A 20 nm Ru layer (an intermediate layer) was film-formed on a TiCr layer (a lower coating layer) with the following film-forming conditions.

Sputtering method: DC magnetron sputtering method
Target: Ru target
Gas type: Ar
Gas pressure: 1.6 Pa Example 3-2

A magnetic tape was obtained in the same manner as in example 3-1 apart from changing the gas pressure to 1.00 Pa in the film-forming process of the lower coating layer and changing the gas pressure to 0.5 Pa in the film-forming process of the intermediate layer.

Example 4-1

A magnetic tape was obtained in the same manner as in example 3-1 apart from film-forming an intermediate layer with a two-layer structure instead of an intermediate layer with a single layer structure. Below, description will be given of the film-forming process of the intermediate layer which has a two-layer structure.

Film-Forming Process of First Intermediate Layer

Next, a 10 nm Ru layer was film-formed as the first intermediate layer on a TiCr layer (a lower coating layer) with the following film-forming conditions.

Sputtering method: DC magnetron sputtering method
Target: Ru target
Gas type: Ar
Gas pressure: 0.5 Pa Film-Forming Process of Second Intermediate Layer Next, a 20 nm Ru layer was film-formed as a second intermediate layer on an Ru layer (a first intermediate layer) with the following film-forming conditions.

Sputtering method: DC magnetron sputtering method
Target: Ru target
Gas type: Ar
Gas pressure: 1.6 Pa Example 5-1

A magnetic tape was obtained in the same manner as in example 4-1 apart from film-forming a lower coating layer with a two-layer structure instead of a lower coating layer with a single layer structure. Below, description will be given of a film-forming process of the lower coating layer which has a two-layer structure.

Film-Forming Process of First Lower Coating Layer

Next, a 2.5 nm TiCr layer (a first lower coating layer) was film-formed on a CoZrNb layer (a second soft magnetic layer) with the following film-forming conditions.

Sputtering method: DC magnetron sputtering method
Target: $Ti_{50}Cr_{50}$ target
Ultimate vacuum: $5 \times 10^{-5}$ Pa
Gas type: Ar
Gas pressure: 0.5 Pa Film-forming Process of Second Lower Coating Layer Next, a 10 nm NiW layer (a second lower coating layer) was film-formed on a TiCr layer with the following film-forming conditions.

Sputtering method: DC magnetron sputtering method
Target: NiW target
Ultimate vacuum: $5 \times 10^{-5}$ Pa
Gas type: Ar
Gas pressure: 0.25 Pa Comparative Example 5-1

A magnetic tape was obtained in the same manner as in example 5-1 apart from changing the input electric power to 55 mW/mm² in the process of the first soft magnetic layer and the process of the second soft magnetic layer.

Example 5-2

A magnetic tape was obtained in the same manner as example 5-1 apart from changing the average thickness of the (CoCrPt)—($SiO_2$) layer (recording layer) to 10 nm.

Examples 5-3 and 5-4

A magnetic tape was obtained in the same manner as in example 5-1 apart from changing the gas pressure to 0.8 Pa and 1.2 Pa in the film-forming process of the recording layer.

Example 6-1

A magnetic tape was obtained in the same manner as in example 2-4 apart from being further provided with the film-forming process in the following CAP layer after the film-forming process of the recording layer before the film-forming process of the protective layer.

Film-Forming Process of CAP Layer

A magnetic tape was obtained in the same manner as in example 5-1 apart from film-forming an 8 nm CoPtCrB layer (a CAP layer) between the recording layer and the protective layer with the following film-forming conditions.

Sputtering method: DC magnetron sputtering method
Target: CoPtCrB target
Gas type: Ar
Gas pressure: 1.5 Pa Examples 6-2 and 6-3

A magnetic tape was obtained in the same manner as in example 6-1 apart from changing the gas pressure to 1.2 Pa and 2.0 Pa in the film-forming process of the intermediate layer.

Evaluation

The magnetic tapes which were obtained as described above were evaluated as follows.

Arithmetic Average Roughness Ra of Polymer Film Surface

A cross-sectional TEM image (a ×2 million image with a length of 100 nm or longer in the longitudinal direction) of a magnetic tape was imaged. From the cross-sectional TEM image, the unevenness of an interface between a polymer film and an upper layer which is provided to be adjacent to the surface thereof was measured at 200 places over a length of 100 nm (desirably at approximately even intervals of 0.5 nm) and the arithmetic average roughness thereof was obtained.

The definition of the arithmetic average roughness Ra (nm) is as described below.

$Z(i)$: measurement value at each measurement point (nm)
$i$: measurement point number $i=1$ to 200 points
$Z\_ave$: average center line, $(Z(1)+Z(2)+ \ldots +Z(200))/200$
$Z''(i)$: deviation from average center line at each measurement point, $Z(i)-Z\_ave$
$Ra(nm) = (Z''(1)+Z''(2)+ \ldots +Z''(200))/200$ Arithmetic Average Roughness Ra of Interface between SUL and Lower Coating Layer A cross-sectional TEM image (a ×2 million image with a length of 100 nm or longer in the longitudinal direction) of a magnetic tape was imaged. From the cross-sectional TEM image, unevenness of the interface between the SUL and the lower coating layer was measured at 200 places over a length of 100 nm (desirably at approximately even intervals of 0.5 nm) and the arithmetic average roughness thereof was obtained. Here, the definition of the arithmetic average roughness Ra (nm) was as described above.

Orientation Strength $\Delta\theta_{50}$ of Recording Layer $\Delta\theta_{50}$ was obtained by measuring a diffraction peak of magnetic atoms which are included in the recording layer by a locking curve method.

Orientation Strength $\Delta\theta_{50}$ of Intermediate Layer $\Delta\theta_{50}$ was obtained by measuring a diffraction peak of atoms which are included in the intermediate layer by a locking curve method.

Magnetic Characteristics of Recording Layer

Magnetic characteristics (Hc and Rs) in a perpendicular direction of the recording layer were examined using a vibrating sample magnetometer (VSM).

Evaluation of Recording and Play Back Characteristics

Recording and play back characteristics of single layer perpendicular magnetic tapes which did not have a lower coating layer (examples 1-1 and 1-2, comparative examples 1-1 to 1-3) were evaluated as follows. Firstly, a play back signal of the magnetic tape was acquired using a loop tester (manufactured by Microphysics, Inc). The conditions for acquiring the play back signal are shown below.

Head: GMR
Head speed: 2 m/s
Signal: single recording frequency (10 MHz)
Recording current: optimum recording current Next, a play back signal was taken in at SPAN 0 to 20 MHz (resolution band width=100 kHz, VBW=30 kHz) by a spectrum analyzer. Next, by setting a peak of the taken in spectrum as a signal amount S and setting floor noise where a peak is removed as a noise amount N by carrying out integration, a ratio S/N of the signal amount S and the noise amount N was obtained as a signal-to-noise ratio (SNR). Next, the obtained SNR was converted into a relative value (dB) for which the SNR in comparative example 1-1 as reference media was a reference.

Recording and play back characteristics of two-layer perpendicular magnetic tapes which had a lower coating layer (examples 2-1 to 6-3, comparative examples 2-1 to 5-1) were evaluated as follows. Firstly, using a single pole type recording head and a tunnel magnetoresistive (TMR) type play back head, measurement was performed by performing recording and play back by vibrating the head in a reciprocating manner using a piezo-stage, or in a so-called drag tester. In a high recording density recording region which exceeds 100 Gb/in$^2$, it is difficult to realize sufficient recording and play back characteristics even with a perpendicular magnetic recording medium mainly due to recording problems and a combination of a single pole type (SPT) head able to generate a magnetic field which is steep in an orthogonal direction and a two-layer perpendicular magnetic recording medium which has a soft magnetic underlayer (SUL) is necessary. In addition, it is considered that a tunnel magnetoresistive (TMR) type play back head where the magnetic resistance changing rate is large and play back sensitivity is high compared to a giant magnetoresistive head is also necessary. For such a reason, here, evaluation was carried out using a STP recording head and a TMR play back head. Here, a lead track width of a play back head was set to 75 nm. Next, by setting a recording wave length to 300 kilo flux changes per inch (kFCI), the SNR was obtained by calculating by a ratio of a peak to peak voltage of a play back waveform and a voltage obtained from a value where a noise spectrum was integrated in a band of 0 kFCI to 600 kFCI. Next, the obtained SNR was converted into a relative value (dB) for which the SNR in comparative example 1-1 as reference media was a reference.

The film-forming conditions of the magnetic tapes in examples 1-1 and 1-2 and comparative examples 1-1 to 1-3 are shown.

TABLE 1

| | Layer Configuration | | | | | | | | | | | |
|---|---|---|---|---|---|---|---|---|---|---|---|---|
| | | Magnetic Layer | | Intermediate Layer | | | Lower Coating Layer | | | | SUL | | TiCr Layer |
| | CAP Layer | | | Second layer | | First layer | Second layer | | First layer | | | | |
| | Present or Absent | Thickness (nm) | Gas pressure (Pa) | Present or Absent | layer gas pressure (Pa) | Present or Absent | Present or Absent | layer gas pressure (Pa) | Present or Absent | Present or Absent | Pow (mW/mm$^2$) | Layer structure | Present or Absent |
| Example 1-1 | Absent | 14 | 1.0 | Absent | — | Absent | Present | 0.25 | Absent | Absent | — | — | Absent |
| Comparative Example 1-1 | Absent | 14 | 1.0 | Absent | — | Absent | Present | 0.25 | Absent | Absent | — | — | Absent |
| Comparative Example 1-2 | Absent | 14 | 1.0 | Absent | — | Absent | Present | 0.25 | Absent | Absent | — | — | Absent |

The evaluation results of the magnetic tapes in examples 1-1 and 1-2 and comparative examples 1-1 to 1-3 are shown.

TABLE 2

| | Surface Property | | | | Particle | | | | |
| | Base material | SUL | $\Delta\theta_{50}$ | | Diameter | Kerr Magnetic | | Determination | |
| | Arithmetic | Arithmetic | Intermediate | Magnetic | Magnetic | Characteristic | | Index | |
| | average roughness (nm) | average roughness (nm) | layer $\Delta\theta_{50}$ (deg) | layer $\Delta\theta_{50}$ (deg) | layer $\Phi$ (mm) | Hc (Oe) | Rs (%) | SNR (dB) | Friction (%) |
|---|---|---|---|---|---|---|---|---|---|
| Example 1-1 | 0.5 | — | — | 8.0 | 7.0 | 3500 | 88 | 1.0 | 109 |
| Comparative Example 1-1 | 1.2 | — | — | 10.0 | 7.0 | 2900 | 80 | 0.0 | 100 |
| Comparative Example 1-2 | 0.3 | — | — | 4.8 | 7.0 | 3700 | 90 | 1.5 | Stuck |

The film-forming conditions of the magnetic tapes in examples 2-1 to 2-4 and comparative examples 2-1 to 2-3 are shown.

TABLE 3

| | Layer Configuration | | | | | | | | | | | |
| | | | Intermediate Layer | | | Lower Coating Layer | | | | | | |
| | CAP Layer | Magnetic Layer | | Second layer | Second | First layer | Second layer | Second | First layer | SUL | | TiCr Layer |
| | Present or absent | Thickness (nm) | Gas pressure (Pa) | present or absent | layer gas pressure (Pa) | present or absent | present or absent | layer gas pressure (Pa) | present or absent | Present or absent | Pow (mW/mm²) | Layer structure | Present or absent |
|---|---|---|---|---|---|---|---|---|---|---|---|---|---|
| Example 2-1 | Absent | 14 | 1.0 | Absent | — | Absent | Present | 0.25 | Absent | Present | 96 | SL | Absent |
| Example 2-2 | Absent | 14 | 1.0 | Absent | — | Absent | Present | 0.25 | Absent | Present | 96 | SL | Absent |
| Comparative Example 2-1 | Absent | 14 | 1.0 | Absent | — | Absent | Present | 0.25 | Absent | Present | 96 | SL | Absent |
| Comparative Example 2-2 | Absent | 14 | 1.0 | Absent | — | Absent | Present | 0.25 | Absent | Present | 96 | SL | Absent |
| Example 2-3 | Absent | 14 | 1.0 | Absent | — | Absent | Present | 0.25 | Absent | Present | 96 | APC | Absent |
| Example 2-4 | Absent | 14 | 1.0 | Absent | — | Absent | Present | 0.25 | Absent | Present | 96 | APC | Present |
| Comparative Example 2-3 | Absent | 14 | 1.0 | Absent | — | Absent | Present | 0.25 | Absent | Present | 55 | APC | Present |

Here, in Table 3, "Pow." indicates the input sputtering electric power at the time of film production, "SL" indicates an SUL with a single layer structure, and "APC" indicates an SUL with an antiparallel coupled structure.

The evaluation results of the magnetic tapes in examples 2-1 to 2-4 and comparative examples 2-1 to 2-3 are shown.

TABLE 4

| | Surface Property | | | | Particle | | | | |
| | Base material | SUL | $\Delta\theta_{50}$ | | Diameter | Kerr Magnetic | | Determination Index | |
| | Arithmetic | Arithmetic | Intermediate | Magnetic | Magnetic | Characteristic | | | |
| | average roughness (nm) | average roughness (nm) | layer $\Delta\theta_{50}$ (deg) | layer $\Delta\theta_{50}$ (deg) | layer $\Phi$ (mm) | Hc (Oe) | Rs (%) | SNR (dB) | Friction (%) |
|---|---|---|---|---|---|---|---|---|---|
| Example 2-1 | 0.5 | 0.5 | — | 8.0 | 7.0 | 3500 | 88 | 1.0 | 105 |
| Example 2-2 | 1.0 | 1.0 | — | 9.8 | 7.0 | 3100 | 85 | 0.5 | 102 |
| Comparative Example 2-1 | 1.2 | 1.2 | — | 11.0 | 7.0 | 2800 | 80 | −0.8 | 99 |
| Comparative Example 2-2 | 0.3 | 0.3 | — | 4.8 | 7.0 | 3700 | 90 | 1.5 | Stuck |
| Example 2-3 | 0.5 | 0.5 | — | 7.5 | 7.0 | 3500 | 88 | 1.3 | 106 |

TABLE 4-continued

| | Surface Property | | $\Delta\theta_{50}$ | | Particle | Kerr Magnetic Characteristic | | Determination Index | |
|---|---|---|---|---|---|---|---|---|---|
| | Base material Arithmetic average roughness (nm) | SUL Arithmetic average roughness (nm) | Intermediate layer $\Delta\theta_{50}$ (deg) | Magnetic layer $\Delta\theta_{50}$ (deg) | Diameter Magnetic layer Φ (mm) | Hc (Oe) | Rs (%) | SNR (dB) | Friction (%) |
| Example 2-4 | 0.5 | 0.5 | — | 7.5 | 7.0 | 3600 | 89 | 1.3 | 106 |
| Comparative Example 2-3 | 0.5 | 1.2 | — | 11.0 | 7.0 | 2600 | 78 | −1.5 | 106 |

The film-forming conditions of the magnetic tapes in examples 3-1 to 6-3 and comparative Example 5-1 are shown.

TABLE 5

| | | | Layer Configuration | | | | | | | | | | |
|---|---|---|---|---|---|---|---|---|---|---|---|---|---|
| | CAP Layer | Magnetic Layer | | Intermediate Layer | | | Lower Coating Layer | | | | SUL | | TiCr Layer |
| | | | Second layer | Second | First layer | Second layer | Second | First layer | | | | | |
| | Present or absent | Thickness (nm) | Gas pressure (Pa) | present or absent | layer gas pressure (Pa) | present or absent | present or absent | layer gas pressure (Pa) | present or absent | Present or absent | Pow (mW/mm$^2$) | Layer structure | Present or absent |
| Example 3-1 | Absent | 14 | 1.0 | Present | 1.6 | Absent | Present | 0.25 | Absent | Present | 96 | APC | Present |
| Example 3-2 | Absent | 14 | 1.0 | Present | 0.5 | Absent | Present | 1.00 | Absent | Present | 96 | APC | Present |
| Example 4-1 | Absent | 14 | 1.0 | Present | 1.6 | Present | Present | 0.25 | Absent | Present | 96 | APC | Present |
| Example 5-1 | Absent | 14 | 1.0 | Present | 1.6 | Present | Present | 0.25 | Present | Present | 96 | APC | Present |
| Comparative Example 5-1 | Absent | 14 | 1.0 | Present | 1.6 | Present | Present | 0.25 | Present | Present | 55 | APC | Present |
| Example 5-2 | Absent | 10 | 1.0 | Present | 1.6 | Present | Present | 0.25 | Present | Present | 96 | APC | Present |
| Example 5-3 | Absent | 14 | 0.8 | Present | 1.6 | Present | Present | 0.25 | Present | Present | 96 | APC | Present |
| Example 5-4 | Absent | 14 | 1.2 | Present | 1.6 | Present | Present | 0.25 | Present | Present | 96 | APC | Present |
| Comparative Example 6-1 | Present | 14 | 1.0 | Present | 1.6 | Present | Present | 0.25 | Present | Present | 96 | APC | Present |
| Comparative Example 6-2 | Present | 14 | 1.0 | Present | 1.2 | Present | Present | 0.25 | Present | Present | 96 | APC | Present |
| Comparative Example 6-3 | Present | 14 | 1.0 | Present | 2.0 | Present | Present | 0.25 | Present | Present | 96 | APC | Present |

Here, in Table 5, "Pow." indicates the sputtering electric power at the time of film production, "SL" indicates an SUL with a single layer structure, and "APC" indicates an SUL with an antiparallel coupled structure.

The evaluation results of the magnetic tapes in examples 3-1 to 6-3 and comparative example 5-1 are shown.

TABLE 6

| | Surface Property | | $\Delta\theta_{50}$ | | Particle | Kerr Magnetic Characteristic | | Determination Index | |
|---|---|---|---|---|---|---|---|---|---|
| | Base material Arithmetic average roughness (nm) | SUL Arithmetic average roughness (nm) | Intermediate layer $\Delta\theta_{50}$ (deg) | Magnetic layer $\Delta\theta_{50}$ (deg) | Diameter Magnetic layer Φ (mm) | Hc (Oe) | Rs (%) | SNR (dB) | Friction (%) |
| Example 3-1 | 0.5 | 0.5 | 6.5 | 7.0 | 7.0 | 4200 | 93 | 1.8 | 107 |
| Example 3-2 | 0.5 | 0.5 | 8.7 | 9.7 | 7.0 | 3200 | 86 | 0.4 | 107 |
| Example 4-1 | 0.5 | 0.5 | 6.5 | 7.0 | 7.0 | 4500 | 93 | 2.1 | 105 |
| Example 5-1 | 0.5 | 0.5 | 6.5 | 7.0 | 7.0 | 4700 | 98 | 2.5 | 104 |
| Comparative Example 5-1 | 0.5 | 1.2 | 10.0 | 11.0 | 7.0 | 2700 | 78 | −0.3 | 99 |
| Example 5-2 | 0.5 | 0.5 | 6.5 | 7.0 | 7.0 | 4000 | 95 | 1.0 | 105 |
| Example 5-3 | 0.5 | 0.5 | 6.5 | 7.0 | 8.0 | 4500 | 95 | 0.5 | 105 |
| Example 5-4 | 0.5 | 0.5 | 5.5 | 7.0 | 6.0 | 4500 | 95 | 2.2 | 105 |

TABLE 6-continued

|  | Surface Property | | $\Delta\theta_{50}$ | | Particle Diameter | Kerr Magnetic Characteristic | | Determination Index | |
|---|---|---|---|---|---|---|---|---|---|
|  | Base material Arithmetic average roughness (nm) | SUL Arithmetic average roughness (nm) | Intermediate layer $\Delta\theta_{50}$ (deg) | Magnetic layer $\Delta\theta_{50}$ (deg) | Magnetic layer $\Phi$ (mm) | Hc (Oe) | Rs (%) | SNR (dB) | Friction (%) |
| Example 6-1 | 0.5 | 0.5 | 6.5 | 7.5 | 7.0 | 4500 | 93 | 2.3 | 104 |
| Example 6-2 | 0.5 | 0.5 | 6.5 | 7.5 | 7.0 | 3000 | 85 | 0.2 | 105 |
| Example 6-3 | 0.5 | 0.5 | 6.5 | 7.5 | 7.0 | 5500 | 100 | 2.8 | 107 |

The following are understood from Table 1 and Table 2.

In example 1-1, since the arithmetic average roughness Ra of a polymer film surface (that is, the arithmetic average roughness Ra of an interface between a polymer film and a lower coating layer) is within a range of 0.4 nm or more to 1.0 nm or less, $\Delta\theta_{50}$ of the recording layer is within a range of 5° or more to less than 10°. Accordingly, a favorable SNR is obtained and an increase in friction is suppressed.

In comparative example 1-1, since the arithmetic average roughness Ra of a polymer film surface (that is, the arithmetic average roughness Ra of the interface between the polymer film and the lower coating layer) exceeds 1.0 nm, $\Delta\theta_{50}$ of the recording layer is 10° or more. Accordingly, an increase in friction is suppressed; however, the SNR decreases.

In comparative example 1-2, since the arithmetic average roughness Ra of a polymer film surface (that is, the arithmetic average roughness Ra of an interface between the polymer film and the lower coating layer) is less than 0.4 nm, $\Delta\theta_{50}$ of the recording layer is less than 5°. Accordingly, a favorable SNR is obtained; however, sticking occurs between the magnetic tape and the head.

The following are understood from Table 3 and Table 4.

In examples 2-1 and 2-2, since the SUL is provided between the base material and the lower coating layer and the arithmetic average roughness Ra of an interface between the SUL and the lower coating layer is within a range of 0.4 nm or more to 1.0 nm or less, $\Delta\theta_{50}$ of the recording layer is within a range of 5° or more to less than 10°. Accordingly, a favorable SNR is obtained and an increase in friction is suppressed.

In comparative example 2-1, since the SUL is provided between the base material and the lower coating layer and the arithmetic average roughness Ra of an interface between the SUL and the lower coating layer exceeds 1.0 nm and is great, $\Delta\theta_{50}$ of the recording layer exceeds 10°. Accordingly, an increase in friction is suppressed; however, the SNR decreases.

In comparative example 2-2, since the SUL is provided between the base material and the lower coating layer and the arithmetic average roughness Ra of an interface between the SUL and the lower coating layer is less than 0.4 nm, $\Delta\theta_{50}$ of a recording layer is less than 5°. Accordingly, a favorable SNR is obtained; however, sticking occurs between the magnetic tape and the head.

In examples 2-3 and 2-4, the SUL has an APC structure. Even in the case of such a configuration, in the same manner as a case where the SUL has a single layer structure, when the arithmetic average roughness Ra of an interface between the SUL and the lower coating layer is within a range of 0.4 nm or more to 1.0 nm or less, $\Delta\theta_{50}$ of the recording layer is within a range of 5° or more to less than 10°. Accordingly, a favorable SNR is obtained and an increase in friction is suppressed.

In comparative example 2-3, the SUL has an APC structure. Even in a case of such a configuration, in the same manner as a case where the SUL has a single layer structure, when the arithmetic average roughness Ra of an interface between the SUL and the lower coating layer exceeds 1.0 nm, $\Delta\theta_{50}$ of a recording layer exceeds 10°. Accordingly, an increase in friction is suppressed; however, the SNR decreases.

The following are understood from Table 5 and Table 6.

In examples 3-1 and 3-2, an intermediate layer with a single layer structure is provided between the lower coating layer and the recording layer. In a case of such a configuration, when the arithmetic average roughness Ra of an interface between the SUL and the lower coating layer is within a range of 0.4 nm or more to 1.0 nm or less, $\Delta\theta_{50}$ of the recording layer is within a range of 5° or more to less than 10° and $\Delta\theta_{50}$ of the intermediate layer is 4° or more to 9° or less, a favorable SNR is obtained, and increase in friction is suppressed.

In example 4-1, the structure of the intermediate layer is a two-layer structure. In a case of this configuration, in the same manner as the case of an intermediate layer with a single layer structure, when the arithmetic average roughness Ra of an interface between the SUL and the lower coating layer is within a range of 0.4 nm or more to 1.0 nm or less, $\Delta\theta_{50}$ of the recording layer is within a range of 5° or more to less than 10° and $\Delta\theta_{50}$ of an intermediate layer is 4° or more to 9° or less, a favorable SNR is obtained, and an increase in friction is suppressed.

In examples 5-1 to 5-4, the lower coating layer has a two-layer structure. Even in a case of this configuration, in the same manner as a case of the intermediate layer with a single layer structure, when the arithmetic average roughness Ra of an interface between the SUL and the lower coating layer is within a range of 0.4 nm or more to 1.0 nm or less, $\Delta\theta_{50}$ of a recording layer is within a range of 5° or more to less than 10° and $\Delta\theta_{50}$ of an intermediate layer is 4° or more to 9° or less, a favorable SNR is obtained, and an increase in friction is suppressed.

In comparative example 5-1, the lower coating layer has a two-layer structure. Even in a case of such a configuration, in the same manner as a case where the SUL has a single layer structure, when the arithmetic average roughness Ra of an interface between the SUL and the lower coating layer exceeds 1.0 nm, $\Delta\theta_{50}$ of the recording layer exceeds 10°. In addition, $\Delta\theta_{50}$ of the intermediate layer exceeds 9°. Accordingly, an increase in friction is suppressed; however, the SNR decreases.

Above, detailed description was given of embodiments of the present application and modified examples and examples thereof; however, the present application is not limited to the embodiments and modified examples and examples thereof described above and various types of modifications are possible based on the technical idea of the present application.

For example, the configurations, the methods, the processes, the shapes, the materials, the numeric values, and the like which are given in the embodiments and the modified examples and examples thereof are merely examples and configurations, methods, processes, shapes, materials, numeric values, and the like which are different therefrom may be used as necessary.

In addition, the configurations, the methods, the processes, the shapes, the materials, the numeric values, and the like of the embodiments and the modified examples and examples thereof described above are able to be combined with each other within a scope which does not depart from the gist of the present application.

In addition, the present application is also able to adopt the following configurations.

(1) A magnetic recording medium including a base material which has flexibility, a lower coating layer, and a recording layer, in which, in X-ray diffraction peaks, a value of $\Delta\theta_{50}$ where a diffraction peak of magnetic atoms which are included in the recording layer is measured by a locking curve method is 5° or more to less than 10°.

(2) The magnetic recording medium according to (1), in which an arithmetic average roughness Ra of an interface of the base material and the lower coating layer is 0.4 nm or more to 1.0 nm or less.

(3) The magnetic recording medium according to (1) or (2), further including a soft magnetic underlayer which is provided between the base material and the lower coating layer, in which an arithmetic average roughness Ra of an interface of the soft magnetic underlayer and the lower coating layer is 0.4 nm or more to 1.0 nm or less.

(4) The magnetic recording medium according to (3), in which the soft magnetic underlayer has an APC structure.

(5) The magnetic recording medium according to (3) or (4), further including a layer which is provided between the base material and the soft magnetic underlayer and which includes a Ti alloy.

(6) The magnetic recording medium according to any one of (1) to (5), further including an intermediate layer which is provided between the lower coating layer and the recording layer, wherein, in X-ray diffraction peaks, a value of $\Delta\theta_{50}$ where a diffraction peak of atoms which are included in the intermediate layer is measured by a locking curve method is 4° or more to 9° or less.

(7) The magnetic recording medium according to (6), in which the intermediate layer is provided with a plurality of layers with a same composition and different film-forming conditions.

(8) The magnetic recording medium according to (6) or (7), in which the intermediate layer includes Ru.

(9) The magnetic recording medium according to any one of (1) to (8), in which the lower coating layer includes Ti or Ni.

(10) The magnetic recording medium according to any one of (1) to (9), in which an average thickness of the recording layer is 10 nm or more.

(11) The magnetic recording medium according to any one of (1) to (10), in which the recording layer is a perpendicular recording layer.

(12) The magnetic recording medium according to any one of (1) to (11), in which the recording layer has a granular structure.

(13) The magnetic recording medium according to any one of (1) to (12), in which the recording layer includes an alloy which includes Co, Cr, and Pt and an oxide which includes Si.

(14) The magnetic recording medium according to any one of (1) to (13), in which an average particle diameter of crystal particles which are included in the recording layer is 6 nm or more to 8 nm or less.

(15) The magnetic recording medium according to any one of (1) to (14), further including a CAP layer.

(16) The magnetic recording medium according to any one of (1) to (15), in which a coercive force Hc is 3000 Oe or more to 5500 Oe or less, and a squareness ratio Rs is 85% or more.

(17) The magnetic recording medium according to any one of (1) to (16), in which the lower coating layer and the recording layer are film-formed by a sputtering method.

(18) The magnetic recording medium according to any one of (1) to (17), in which the lower coating layer and the recording layer are film-formed by a roll to roll method.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A magnetic recording medium comprising:
   a base material which has flexibility;
   a lower coating layer; and
   a recording layer,
   wherein, in X-ray diffraction peaks, a value of $\Delta\theta_{50}$ where a diffraction peak of magnetic atoms which are included in the recording layer is measured by a locking curve method is from 5° to 10°,
   wherein an arithmetic average roughness Ra of an interface between the base material and a lower layer of the lower coating layer is from 0.4 nm to 1.0 nm.

2. The magnetic recording medium according to claim 1, further comprising a soft magnetic underlayer,
   wherein an arithmetic average roughness Ra of an interface between the soft magnetic underlayer and the lower coating layer is 0.4 nm or more to 1.0 nm or less.

3. The magnetic recording medium according to claim 2, wherein the soft magnetic underlayer includes an antiparallel coupled structure.

4. The magnetic recording medium according to claim 2, further comprising a layer provided between the base material and the soft magnetic underlayer, wherein the layer includes a Ti alloy.

5. The magnetic recording medium according to claim 1, further comprising:
   an intermediate layer which is provided between the lower coating layer and the recording layer,
   wherein, in X-ray diffraction peaks, a value of $\Delta\theta_{50}$ where a diffraction peak of atoms which are included in the intermediate layer is measured by a locking curve method is 4° or more to 9° or less.

6. The magnetic recording medium according to claim 5, wherein the intermediate layer includes a plurality of layers with a same composition and wherein the plurality of layers are provided under different film-forming conditions.

7. The magnetic recording medium according to claim 5, wherein the intermediate layer includes Ru.

8. The magnetic recording medium according to claim 1, wherein the lower coating layer includes Ti or Ni.

9. The magnetic recording medium according to claim 1, wherein an average thickness of the recording layer is 10 nm or more.

10. The magnetic recording medium according to claim 1, wherein the recording layer includes a perpendicular recording layer.

11. The magnetic recording medium according to claim 1, wherein the recording layer includes a granular structure.

12. The magnetic recording medium according to claim 11, wherein the recording layer includes an alloy including Co, Cr, and Pt and an oxide including Si oxide.

13. The magnetic recording medium according to claim 11, wherein an average particle diameter of crystal particles which are included in the recording layer is from 6 nm to 8 nm.

14. The magnetic recording medium according to claim 1, further comprising a cap layer.

15. The magnetic recording medium according to claim 1, wherein a coercive force Hc is from 3000 Oe to 5500 Oe, and a squareness ratio Rs is 85% or more.

16. The magnetic recording medium according to claim 1, wherein the lower coating layer and the recording layer are film-formed by a sputtering method.

17. The magnetic recording medium according to claim 1, wherein the lower coating layer and the recording layer are film-formed by a roll to roll method.

18. The magnetic recording medium according to claim 1, wherein the lower coating layer includes a Ti alloy including Ti and Cr, and the lower coating layer is an amorphous.

19. The magnetic recording medium according to claim 18, wherein the Ti alloy further includes oxygen and wherein a ratio of oxygen in the Ti alloy is equal to or less than 15 atomic %.

* * * * *